(No Model.) 2 Sheets—Sheet 2.
F. A. BONNEFIN.
MACHINE FOR CUTTING SUGAR CANE.
No. 254,914. Patented Mar. 14, 1882.
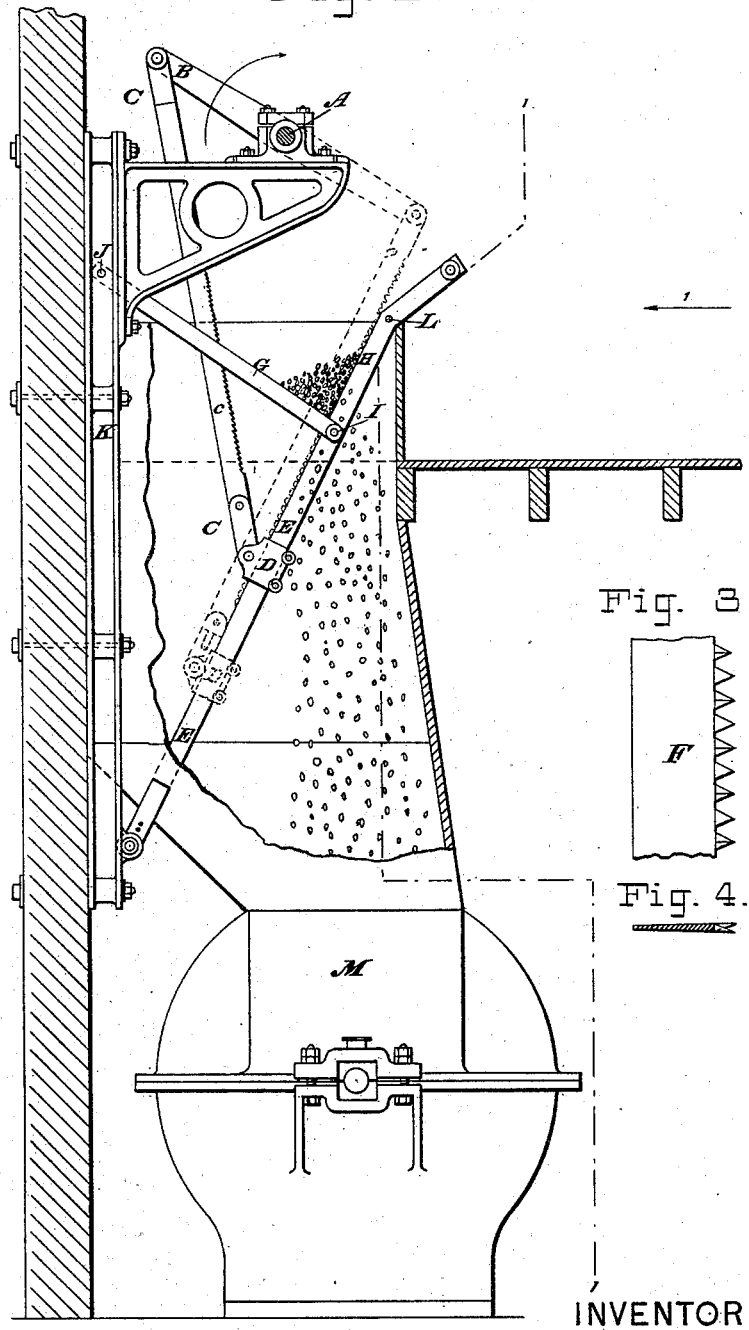
WITNESSES:
E. B. Bolton
Geo. Bainton
INVENTOR:
François A. Bonnefin
By his Attorneys,
Burke, Fraser & Connell

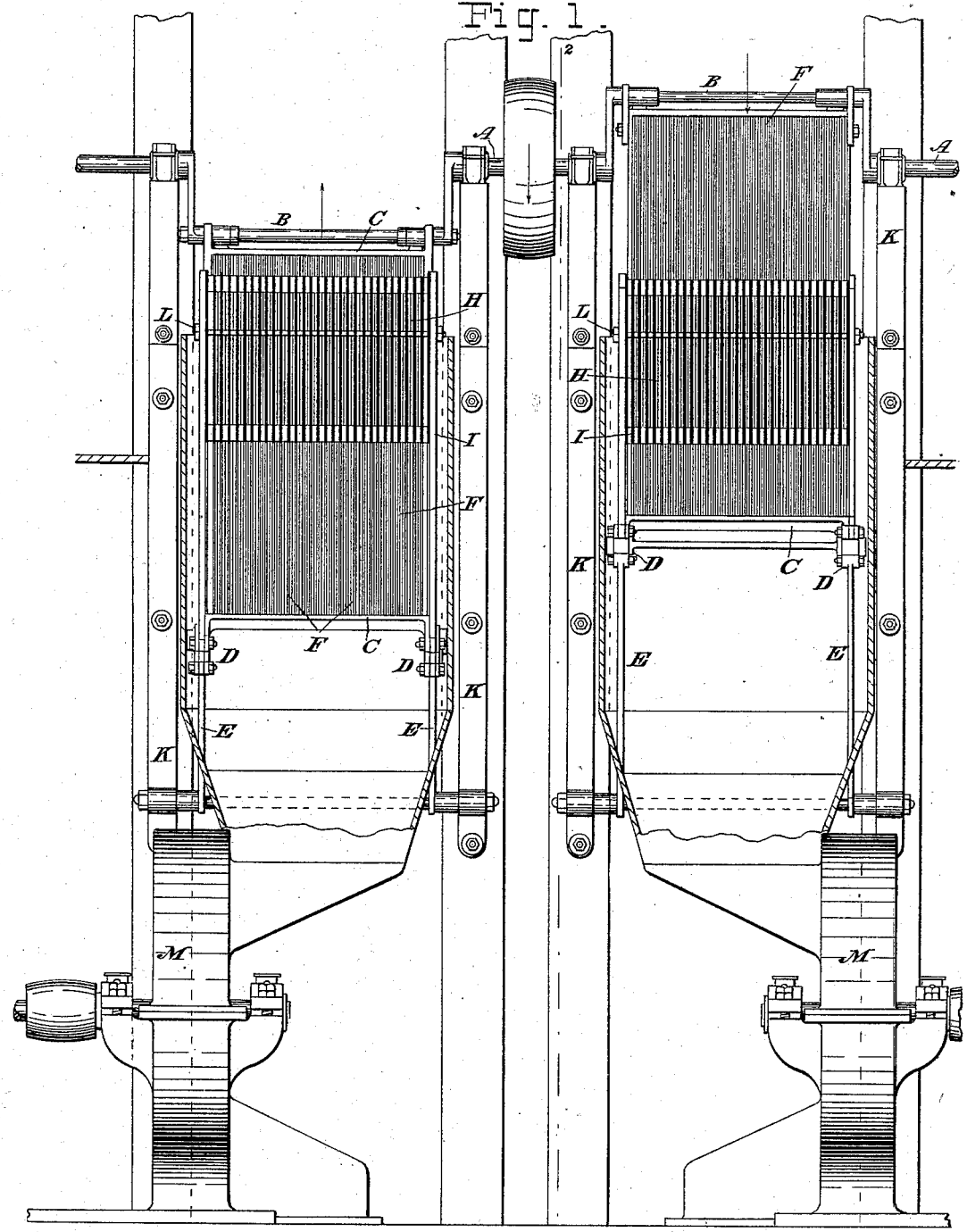

UNITED STATES PATENT OFFICE.

FRANÇOIS ALCIDE BONNEFIN, OF MAURITIUS ISLAND, ASSIGNOR OF ONE-HALF TO BENJAMIN FRANKLIN STEVENS, OF LONDON, ENGLAND.

MACHINE FOR CUTTING SUGAR-CANE.

SPECIFICATION forming part of Letters Patent No. 254,914, dated March 14, 1882.

Application filed September 1, 1881. (No model.) Patented in England March 26, 1877.

*To all whom it may concern:*

Be it known that I, FRANÇOIS ALCIDE BONNEFIN, a subject of the Queen of Great Britain, and residing in Mauritius Island, have invented certain Improvements in Apparatus for Cutting up or Reducing Sugar-Canes or other Vegetable Substances, of which the following is a specification.

This invention forms the subject of Letters Patent granted to me in Great Britain, dated 26th March, 1877, No. 1,185.

The invention has for its object to cut up or divide sugar-canes or other like vegetable substances into thin slices or granules, and for this purpose I employ saw-like cutters arranged and operated in a peculiar manner, as hereinafter described.

I employ a series of saw-blades set parallel to each other in a frame, to which, by means of a steam-engine or other motive power, a reciprocating motion is communicated. The width of the series of saws should exceed the length of the bundles of canes or other produce which it is intended to cut. The saws are set in their frame at distances apart equal to the thickness of the slices it is wished to cut. Each saw-blade is made thicker on the edge on which the teeth are formed than at the back, so that the slices may be able to pass freely between the blades. The teeth are perpendicular to the saw-blade, and are placed alternately on one side and the other of the blade, thereby forming two rows. By this arrangement they do not require to be set.

The bundles of material to be cut are presented to the saws by a rack or cradle, in which they are laid, and the bars of the rack or cradle pass between the saws. They are sufficiently thin to be able to do so, and they need not be many in number. One to every three or four saws will suffice. During the ascending motion of the saw-frame the saws are not in contact with the material to be cut; but in the descending motion the saws advance by an eccentric motion toward the bundle of canes or other produce which has been placed in the rack or cradle, and they cut completely through it, reducing the entire bundle into slices and granules.

The motion which it is preferred to impart to the saw-frame is similar to that of the connecting-rod of an engine—circular at one extremity and rectilinear at the other. This motion causes the saw-frame in its descending stroke to approach the bundle and cut through it with a chopper-like action; or the rack or cradle carrying the bundle to be cut may be caused to advance toward the saw-frame during its downward stroke and the same effect be obtained, the saws working either perpendicularly or with the chopper-like action.

Figure 1 of the annexed drawings is a front elevation of an apparatus constructed according to my invention, with two series of saw-blades with their respective frames and racks or cradles, the said frames being connected to and operated by two cranks at opposite sides of a rotating shaft driven by a steam-engine or other power. Fig. 2 is a side elevation of the apparatus.

A is the rotating shaft; B B, the cranks.

C C are the saw-frames, the upper ends of which are jointed to the cranks B B, while their lower ends are jointed to slides D D, which move up and down inclined guides or side frames, E E.

F F are the saw-blades. They are fixed in the saw-frames C C at top and bottom by clamping or otherwise, and they pass between the bars of the rack or cradle. In the drawings I show three saw-blades between every two adjoining bars of the rack. The rack is approximately of V shape, as seen in Fig. 2, being composed of bars G and H. The bars G are fastened at their lower end by a bolt, I, passed through them and through the guide-frames E, and at their upper ends by a bolt, J, passed through them and through the standards K. The bars H are fastened at their lower ends by the bolt I and near their upper ends by a bolt, L, passing through the guide-frames E. The upper parts of the bars H are bent outward, as seen in Fig. 2, to allow the attendant to supply the bundles of canes or materials to the rack without risk of his being injured by the saws.

The action of the apparatus will be readily understood. The men supply the bundles to the racks or cradles, and the series of saws, by the effect of the cranks B B, first come down upon the bundles with a chopper-like action, and then by a downward rectilinear movement they cut completely through the bundles, dividing them into slices or granules, which, with any escaping juice, will pass through the bars of the cradle, and may be caught in a disintegrator, M, or other apparatus placed to receive them. In their ascending movement the saws, owing to the action of the crank, are out of contact with the material to be cut.

Figs. 3 and 4 are views of part of one of the saw-blades detached. It is thicker on the cutting-edge than at the back, for the purpose before explained, and, as has been already explained, the teeth are perpendicular to the blade and placed alternately at its two sides.

I am fully aware that straw and other cutters have been provided with saws having a reciprocating and swinging motion combined, and that such cutters have been arranged horizontally, with one end attached to a short crank and the other to a rocking lever. I am not aware, however, that saws have ever been arranged in gangs, as herein shown, with the upper end of the frame attached to a crank and the lower end to a cross-head which reciprocates in a right line, whereby the gang moves upward entirely free from the material to be cut, is brought down upon the same with a chopper-like effect, and is then drawn through to complete the cut. This construction enables the operator to feed the bundle of stalks in from the front, whereby the entire mass is cut into slices and granules at one stroke, and the movement of the gang allows ample space and time to feed. In the machines as ordinarily constructed the stalks are fed endwise, and no room is allowed for feeding them sidewise, even if it were desirable to do so.

The construction of saw illustrated in Figs. 3 and 4 I have chosen as well suited to work requiring a very strong tooth. I am aware, however, that a tooth of similar form has been proposed for scroll-saws to enable them to be sharpened by grinding on an emery or other grinder.

What I claim, and desire to secure by Letters Patent, is—

1. A cutter for cane, &c., comprising a gang of saws fixed in a frame, said frame hung to a crank at its upper end, said crank mounted in rotative bearings, slides to which the frame is coupled at its lower end, said slides arranged to reciprocate on inclined guides when the crank is rotated, and a slotted cradle to hold the material to be cut, all combined and arranged substantially as set forth, whereby the gang of saws moves upward entirely outside of the bed occupied by the cane and is brought down upon the same with a chopper like action, substantially as set forth.

2. A cutter for cane, &c., wherein the cane is placed in its cradle or bed and cut at one operation, which comprises a gang of saws mounted in a frame, C, a crank, B, rotatively mounted, to which the upper end of the frame is coupled, slides D, to which the lower end of the frame is coupled, inclined guides E, on which the slides D reciprocate, and a cradle to hold the material to be cut, the bottom of which is composed of bars G, between which the saws reciprocate, and the front wall, H, of bars, arranged in the same inclined plane with the guides E, substantially as set forth.

In witness whereof I have hereunto signed my name in the presence of two subscribing witnesses.

FRANÇOIS ALCIDE BONNEFIN.

Witnesses:
JOHN C. NEWBURN,
GEORGE C. BACON.